Dec. 2, 1958  R. I. MITCHELL  2,862,889
DEAGGLOMERATOR
Filed Oct. 12, 1955
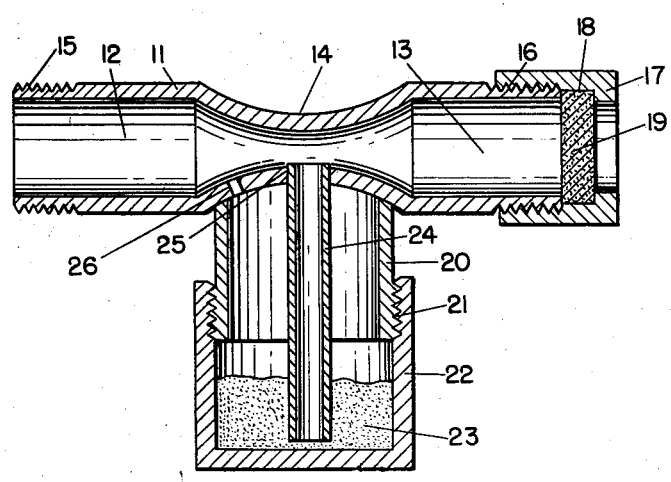
INVENTOR.
Ralph I. Mitchell
BY *Gray, Mase & Dunson*
ATTORNEYS

United States Patent Office 2,862,889
Patented Dec. 2, 1958

2,862,889

DEAGGLOMERATOR

Ralph I. Mitchell, Columbus, Ohio, assignor, by mesne assignments, to The Battelle Development Corporation, Columbus, Ohio, a corporation of Delaware Application October 12, 1955, Serial No. 540,002

4 Claims. (Cl. 252—359)

The present invention relates to the distribution of particles of a powder and more particularly to a method and apparatus for producing aerosols of deagglomerated dry particles.

Dry particles and in particular fine dry particles tend to agglomerate or bunch together. This tendency is not necessarily due to dampness of the tacky nature of the substance, but may be caused by the individual particles possessing unlike charges of static electricity.

The distribution of particles of a powder is an important factor in determining the characteristics of the powder. This is true for cement, pigments, abrasives, ceramics, metal powder, insecticides, drugs, and hundreds of other materials. The even distribution of particles is also an important factor where particles are used in dry reproduction processes.

Most deagglomerators operate by passing an aerosol of the powder to be tested through a slit or small aperture formed by two opposing conical surfaces, the inner of which may be moved axially by means of a calibrated micrometer screw. The shearing forces of the air in the aperture deagglomerate the powder. Actually these devices only partially deagglomerate the powder or produce reproducible amounts of deagglomeration.

The present invention effects a far greater deagglomeration of dry particles than do the prior art devices.

In general, the present invention relates to a method and apparatus whereby aerosols of dry powder are forced by a high velocity stream of gas through a porous material to effect an efficient deagglomeration of the particles.

It is, therefore, an object of this invention to provide a means whereby dry aerosol particles are effectively deagglomerated.

It is also an object of this invention to provide a method and apparatus whereby aerosol particles may be effectively deagglomerated.

Other objects and advantageous features will be obvious from the following specification and claims.

The drawing is a cross-sectional view of the deagglomerator of the present invention. An aerosol is formed when air is passed through an atomizer. In the present invention the aerosol is created by the atomizer and is then forced to pass through a porous material such as a porous metal disk. The mean pore opening of the disk can be of any value from 5 to several hundred microns. By selecting a mean pore opening which is as large as, or larger than, the largest particle to be deagglomerated and using a high velocity air stream to force the particles through the disk, complete or nearly complete deagglomeration may be obtained.

The porous material employed in the present invention may be any material that will satisfactorily withstand the air pressures and abrasive action of the aerosol particles. Thus, plastics, as well as metals, may be employed. However, for most applications, porous metals will prove to be the most satisfactory because of their greater strength.

The method of producing the porous materials may be any of the conventional methods, such as sintering metal compacts of controlled particle size. The only requirement of the finished porous material is that the mean pore size is equal to or larger than the largest particle of the aerosol to be employed.

The thickness of the porous material is not critical and any thickness may be used so long as sufficient pressure is employed to enable the aerosol particles to pass through.

Of course, the smaller the pore size is in respect to the size of the aerosolized particles, the more effective will be the deagglomeration. However, a mean pore size of 20 to 30 microns will effectively deagglomerate aerosolized particles of 1-micron thickness. For optimum results, the mean pore size should not be greater than 50 times the average diameter of the particles to be deagglomerated.

In the embodiment of this invention illustrated in the drawing, there is a tubular member 11 which has an inlet 12 and an outlet 13. Tubular member 11 is formed with an area which is reduced in diameter, as at 14, so that tubular member 11 is a venturi tube. Tubular member 11 is threaded near the inlet 12, as at 15. Threaded area 15 is threaded to an air hose (not shown) which in turn leads to an air pump (not shown) or source of gas pressure. Tubular member 11 is also threaded near outlet 13, as at 16. Threaded to area 16 is a sleeve 17 which possesses a recess, as at 18, to which a porous metal disk 19 is inserted. Connected to tube 11 by any conventional means is a tube-shaped member 20 which is threaded at 21. Threaded area 21 is threaded to a container 22. Container 22 contains the powder to be atomized and deagglomerated 23. A small diameter tube 24 projects through an opening in tubular member 11 at 25 and extends slightly into the inside diameter of the restricted area 14. Tube 24 also projects below the level of the powder 23 in container 22. Tubular member 11 also has an opening 26 leading from the inside of the tube into the area between tube-shaped member 20 and small diameter tube 24 and into the container 22. This opening 26 provides air to container 22 so that a partial vacuum is not created in container 22, thus preventing the powder from atomizing. The operation of the deagglomerator is obvious from the above detailed description. Container 22 is removed from member 20 and the powder to be deagglomerated 23 is placed in the container 22. Container 22 is then rethreaded to member 20 so that tube 24 projects below the level of powder 23. A stream of air or gas pressure is then applied to inlet 12 through the air hose (not shown) threaded to tube 11 at 15. The air flow is greater where it passes tube 24 due to the venturi configuration of the tube 11. In passing over the end of tube 24 projecting above the inside wall of tube 11 at 14 the stream of gas creates a vacuum within tube 24 and thus forces the powder 23 in container 22 to rise through tube 24 and enter the gas stream passing through tube 11. The gas stream, now an aerosol, flows to the outlet 13 and through the porous metal disk 19 and on out through the sleeve 16. The result is a completely or nearly completely deagglomerated aerosol.

It is obvious that the above-described dispersing device can be modified to a considerable extent to fit different uses and demands without departing from the scope of this invention. The venturi configuration of tube 11, for example, contributes to the efficient operation of the device; however, a straight tube could be employed provided sufficient gas pressure is employed to atomize the powder.

Puffball spore powder which has a uniform particle diameter of about 4.5 microns, fine glass beads with particle diameters ranging from about .1 to 20 microns, and baked charcoal powder, flour or an iron oxide powder all possessing an unknown but wide range of particle sizes were individually tested in the deagglomerator illustrated in the drawing. The porous materials employed were 1/16-inch porous stainless steel disks with mean pore sizes of 20, 35, and 65 microns. Air pressures of from 20 to 200 pounds per square inch were applied to the deagglomerator. Samples of the resulting aerosols were collected on glass slides and examined microscopically. It was found that nearly complete deagglomeration has been obtained for each sample tested.

It is not known whether the porous material merely filters the powder to effect deagglomeration or if it puts a like charge on each particle which causes the particles to repel one another. However, it is believed to be a combination of these two actions that effects the complete or nearly complete deagglomeration.

What is claimed is:

1. A deagglomerator comprising a hollow tube formed with an inlet, an outlet, and an opening located between said inlet and said outlet; a second hollow tube projecting through said opening; means for providing a dry powder to said second tube; a porous metal disk covering said outlet so as to provide a deagglomerated aerosol when sufficient gas pressure is applied to said inlet to cause said powder to atomize.

2. A dispersing device for producing aerosols of deagglomerated dry particles comprising a hollow tube formed with an inlet, an outlet, and an opening located between said inlet and said outlet; a second hollow tube communicating with said opening; means for providing a dry powder to said second tube; a porous metal disk formed with a mean pore opening at least equal in size to the largest particle of said powder, said disk covering said outlet so as to provide a deagglomerated aerosol when sufficient gas pressure is applied to said inlet to cause the powder to atomize.

3. A dispersing device for producing aerosols of deagglomerated dry particles comprising a hollow venturi-shaped tube formed with an inlet, an outlet, and an opening located between said inlet and said outlet; a hollow tube communicating with said opening and projecting downwardly; a removable container, which contains a dry powder when said dispersing device is being operated, covering the lower end of said tube; a porous metal disk covering said outlet of said hollow venturi-shaped tube so as to provide a deagglomerated aerosol when sufficient gas pressure is applied to said inlet to atomize said powder.

4. A deagglomerator comprising a hollow venturi-shaped tube open at both ends; a large diameter hollow tube attached to the surface of said hollow venturi-shaped tube projecting downwardly and centrally located at the smallest diameter of said hollow venturi-shaped tube; a cup-shaped container threaded to said large diameter hollow tube at its open end; a small diameter hollow tube located within the hollow of said large diameter hollow tube projecting through an opening at the smallest diameter of said hollow venturi-shaped tube, extending a short distance into the inside diameter of said hollow venturi-shaped tube and projecting downwardly through said large diameter hollow tube and into said cup-shaped container; a sleeve threaded to one end of said hollow venturi-shaped tube; a porous stainless steel disk positioned within said sleeve so as to completely cover the open end of said hollow venturi-shaped tube, so that when powder is placed in the cup-shaped container to a level covering the end of said small diameter hollow tube and gas pressure is applied to the end of the hollow venturi-shaped tube opposite the end where said sleeve and said porous stainless steel disk is located with such pressure as is necessary to create a vacuum in said small diameter hollow tube and cause said powder to rise to the top of the tube and join said gas flow to form an aerosol which will pass through the porous stainless steel disk.

References Cited in the file of this patent
UNITED STATES PATENTS

| | | |
|---|---|---|
| 2,660,564 | Davis | Nov. 24, 1953 |
| 2,730,236 | Missien | Jan. 10, 1956 |
| 2,734,631 | Kabliska | Feb. 14, 1956 |